(12) United States Patent
Yamashita et al.

(10) Patent No.: US 8,038,379 B2
(45) Date of Patent: Oct. 18, 2011

(54) SKID STEER LOADER

(75) Inventors: Yuji Yamashita, Sakai (JP); Hiroyuki Anami, Kaizuka (JP); Yuuki Takano, Sakai (JP); Takeshi Ikumura, Sakai (JP)

(73) Assignee: Kubota Corporation, Osaka (JP)

( * ) Notice: Subject to any disclaimer, the term of this patent is extended or adjusted under 35 U.S.C. 154(b) by 128 days.

(21) Appl. No.: 12/417,008

(22) Filed: Apr. 2, 2009

(65) Prior Publication Data

US 2010/0003117 A1    Jan. 7, 2010

(30) Foreign Application Priority Data

Jul. 1, 2008    (JP) ................................. 2008-172455

(51) Int. Cl.
*B66C 13/00*    (2006.01)
(52) U.S. Cl. .................. 414/680; 180/89.18; 296/190.05
(58) Field of Classification Search .................. 414/680, 414/686; 180/89.13, 89.14, 89.18, 312; 280/834; 296/190.05, 190.06
See application file for complete search history.

(56) References Cited

U.S. PATENT DOCUMENTS

| | | | | |
|---|---|---|---|---|
| 4,723,810 A | * | 2/1988 | Kanemaru et al. | 296/203.02 |
| 5,918,694 A | * | 7/1999 | Miller et al. | 180/89.14 |
| 5,941,330 A | * | 8/1999 | Miller et al. | 180/89.15 |
| 6,098,739 A | * | 8/2000 | Anderson et al. | 180/312 |

* cited by examiner

*Primary Examiner* — Donald Underwood
(74) *Attorney, Agent, or Firm* — The Webb Law Firm

(57) ABSTRACT

A skid steer loader comprises: a main frame assembly (1); a boom assembly (2); a pair of right and left travel assemblies (3); a cabin (4) mounted so as to be capable of being tilted; an engine (5) located so as to be oriented in a longitudinal direction and at a location closer to a rear; a hydrostatic transmission (8) and an oil pump (9) connected to a front portion of the engine (5). A utility space is defined between the oil pump (9) and a bottom (1*a*) of the main frame assembly (1). A fuel tank (6) and a hydraulic tank (7) are located on the bottom of the main frame assembly (1) and to one lateral side and to the other lateral side respectively of the engine (5) and forwardly of the engine (5) in a vicinity of the oil pump (9). At least one of the fuel tank (6) and the hydraulic tank (7) has a laterally extending portion that projects into the utility space.

11 Claims, 7 Drawing Sheets

SKID STEER LOADER

BACKGROUND OF THE INVENTION

1. Field of the Invention

The present invention relates to a layout of on-board components in a skid steer loader.

2. Description of the Related Art

A conventional skid steer loader is known from the U.S. Pat. No. 6,098,739 in which the skid steer loader comprises a travel assembly on right and left both sides, a boom assembly mounted to the front, an engine arranged longitudinally within a main frame assembly which mounts a cabin in its upper portion such that the cabin can be tilted rearwardly, a fuel tank fixedly arranged below the engine, and a hydraulic tank mounted rearwardly of the cabin.

In this skid steer loader, the heavy components (the engine, the fuel tank, the hydraulic tank) mounted to the main frame assembly are not well balanced, and tend to raise the center of gravity and to become unstable.

SUMMARY OF THE INVENTION

One object of the present invention is to provide a skid steer loader with improved positional balance of heavy components mounted on the main frame assembly and with improved stability by lowering the center of gravity.

To achieve the object of the invention, a skid steer loader in accordance with the present invention comprises: a main frame assembly; a boom assembly mounted to the main frame assembly; a pair of right and left travel assemblies for supporting the main frame assembly on the ground; a cabin mounted to an upper portion of the main frame assembly so as to be capable of being tilted; an engine located on the main frame assembly so as to be oriented in a longitudinal direction and at a location closer to a rear of the main frame assembly; a hydrostatic transmission, an oil pump, and a utility space defined between the oil pump and a bottom of the main frame assembly, the hydrostatic transmission and the oil pump being connected to a front portion of the engine, a fuel tank and a hydraulic tank located on the bottom of the main frame assembly and to one lateral side and to the other lateral side respectively of the engine and forwardly of the engine in a vicinity of the oil pump.

By locating the fuel tank and the hydraulic tank forwardly of the engine in a vicinity of the oil pump, the positional balance is improved and the center of gravity is lowered. Especially, by providing at least one of the fuel tank and the hydraulic tank with a laterally extending portion that projects into the utility space, a layout with improved balance and at least one tank with increased capacity are provided.

In addition, in a preferred embodiment, the fuel tank is removably attached to the main frame assembly and a removal space, into which the fuel tank is moved forwardly when removing the fuel tank, is formed in a forward portion of and within the main frame assembly. This facilitates the removal of the fuel tank.

DESCRIPTION OF THE PREFERRED EMBODIMENTS

The preferred embodiment of the present invention is described with reference to the attached drawings. Any feature from one embodiment may be combined with a feature from other embodiment, and such a combination is considered to be within the scope of the present invention, as long as there are no inconsistencies.

Figure 1:
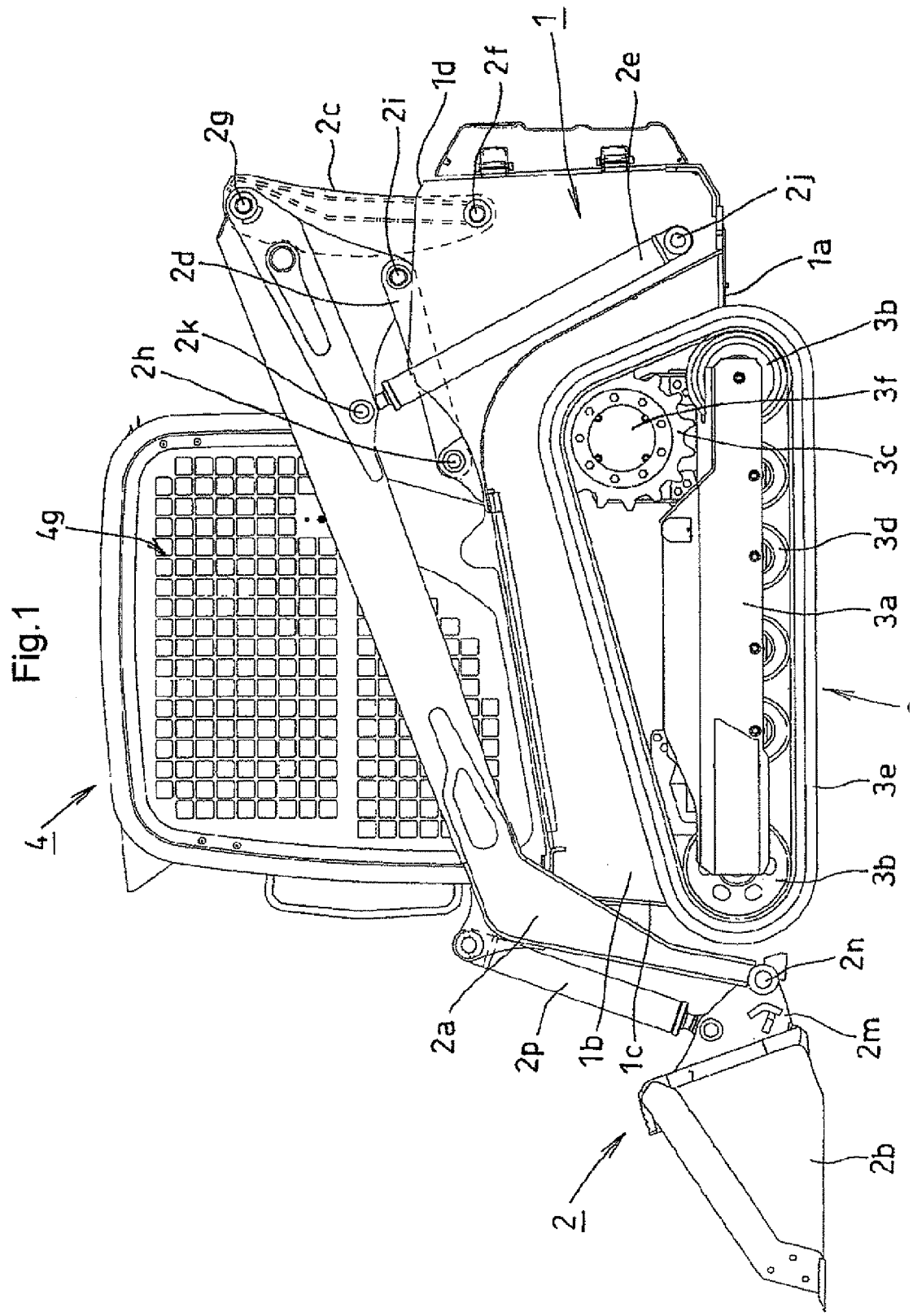
FIG. 1 is a side view of the skid steer loader in accordance with the present invention.
Figure 2:
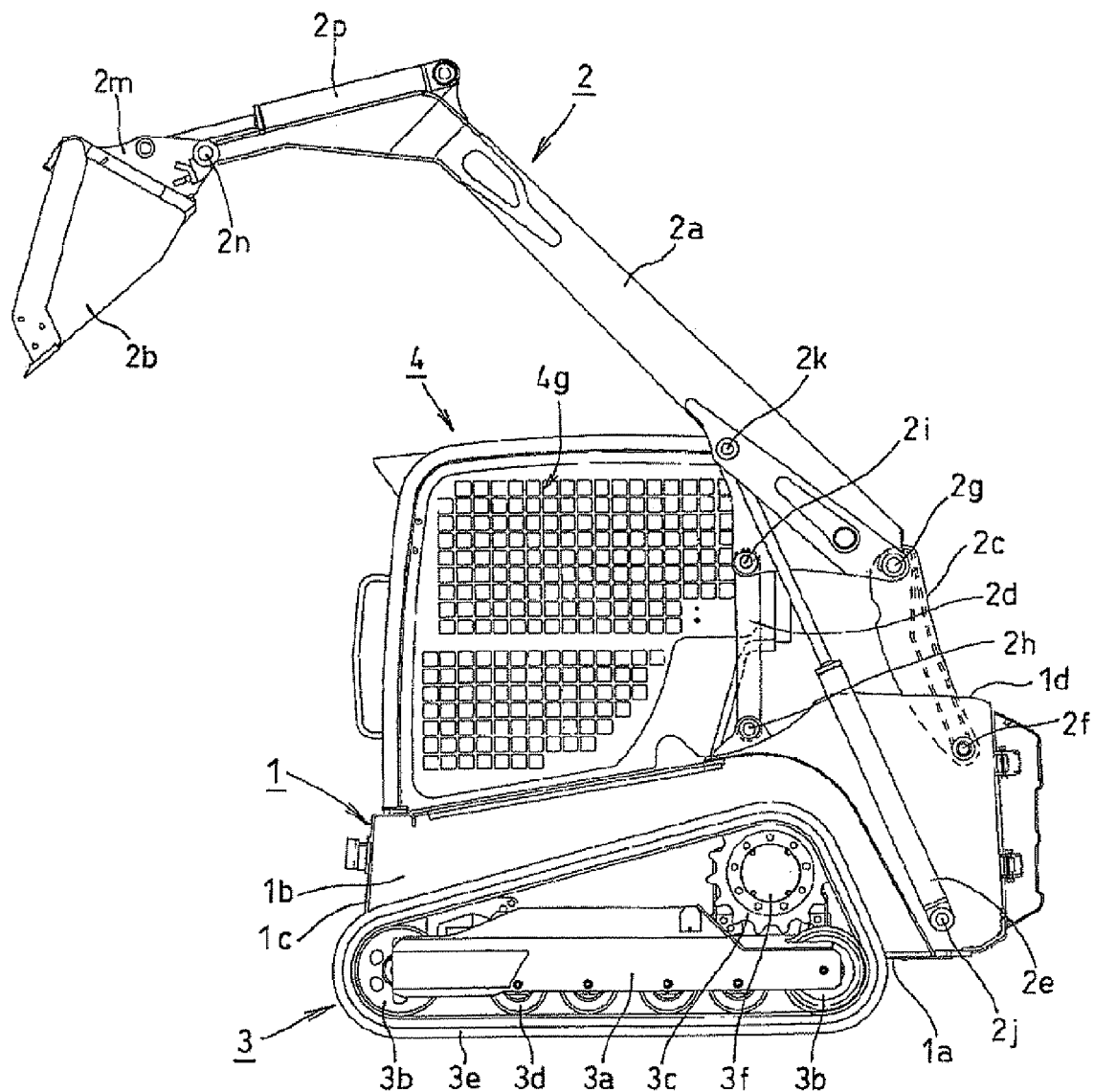
FIG. 2 is a side view with the boom of the boom assembly of FIG. 1 in its raised position.

The skid steer loader, to which the present invention is directed, is provided with a main frame assembly 1, a boom assembly (excavating tool) 2 mounted to the main frame assembly 1, and right-and-left pair of travel assemblies 3 which support the main frame assembly 1 as shown in FIG. 1 and FIG. 2. A cabin 4 is carried in the front portion of the main frame assembly 1.

Figure 3:
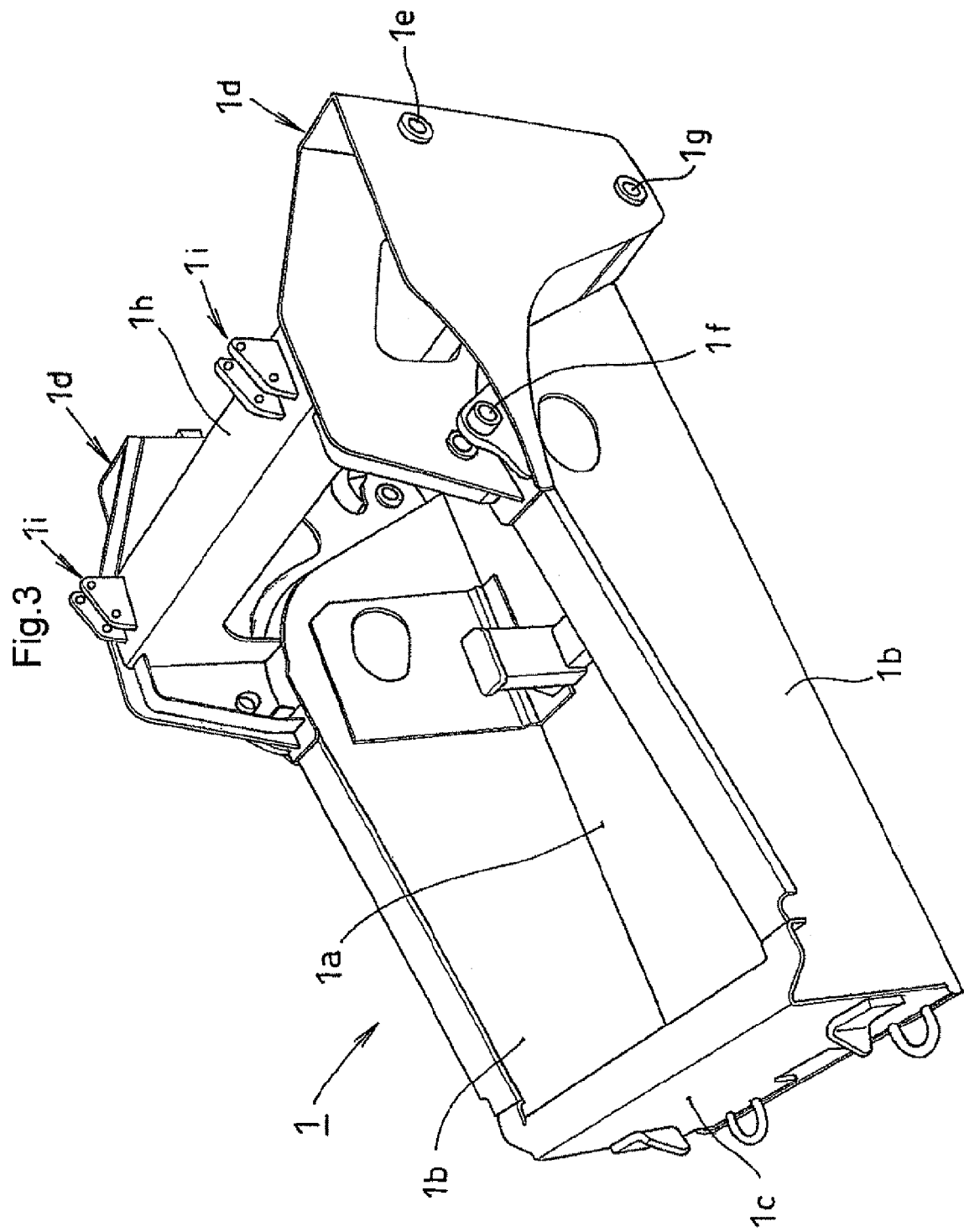
FIG. 3 is a general perspective view of the main frame assembly.

As shown in FIG. 3, the main frame assembly 1 is formed to have a box shape with an upwardly opening upper end and has a bottom 1a, right-and-left pair of side walls 1b, and a front wall 1c. A right and left pair of support frames 1d which are C-shaped in plan view for mounting the boom assembly 2 are installed in the rear of the main frame assembly 1. The first, second and the third attachment bosses 1e, 1f, and 1g for mounting the boom assembly 2 are provided in each of the support frame 1d. The upper parts of the support frames 1d are connected by a connecting member 1h which has a generally horizontal member and a leg member extending downwardly from each end of the horizontal member (referred to as a "gate-shape"). And support brackets 1i for the cabin 4 are provided in the right and left sides of the upper surface of this connecting member 1h.

As shown in FIG. 1 and FIG. 2, the boom assembly 2 includes a right-and-left pair of booms 2a arranged at the right and left sides of the main frame assembly 1, and a bucket (work implement) 2b mounted at the distal ends of the booms 2a. The base or proximate portions of the right and left pair of booms 2a are supported vertically pivotably to the rear upper portions of the main frame assembly 1 through the first lift links 2c and the second lift links 2d. The distal end sides of the booms 2a are moved vertically at a location forwardly of the front side of the main frame assembly 1 by the right and left pair of boom cylinders 2e which are double-acting hydraulic cylinders provided between the base or proximate sides of the right and left pair of booms 2a and the rear lower parts of the main frame assembly 1. A base portion of each first lift link 2c is pivotably attached to the first attachment boss 1e located in the rear upper portion of the support frame d of the main frame assembly 1 such that a base portion of the first lift link 2c is pivotably attached to the first attachment boss 1e located in the rear upper portion of the support frame 1d of the main frame assembly 1 to be rotatable about a laterally extending pivot shaft 2f. The distal end portion of each first lift link 2c is rotatably connected to the base of the boom 2a to be rotatable about a laterally extending pivot shaft 2g. A base portion of each second lift link 2d is pivotably attached to the second attachment boss 1f located in the forward upper portion of the support frame 1d of the main frame assembly 1 to be rotatable about a laterally extending pivot shaft 2h. The distal end portion of each second lift link 2d is rotatably connected to the boom 2a at a location spaced apart forwardly from the base portion thereof to be rotatable about a laterally extending pivot shaft 2i. A base portion of each boom cylinder 2e is pivotably attached to the third attachment boss 1g located in the rear lower portion of the support frame 1d of the main frame assembly 1 to be rotatable about a laterally extending pivot shaft j. The distal end portion of each piston rod is rotatably connected to the boom 2a at a location spaced apart forwardly from the base portion thereof to be rotatable about a laterally extending pivot shaft 2k. The pivot shaft 2k is located to be closer to the distal end of the boom 2a than the pivot shaft 2j. Thus, the right-and-left pair of booms 2a are supported to be vertically pivotable on lateral both sides of the cabin 4 without interfering with the cabin 4. The bucket 2b is configured to be supported by the distal end portion of the boom 2a through the bracket 2m to be pivotable about a laterally extending pivot shaft 2n, and to be pivoted (scooping and dumping movement) by a bucket cylinder 2p which is a double acting hydraulic cylinder.

As shown in FIGS. 1 and 2, the travel assembly 3 includes a pair of front and rear driven wheels 3b that are supported by a track frame 3a, a driving wheel 3c arranged above a location between the pair of front and rear driven wheels 3b, and a plurality of idler wheels 3d arranged at lower positions. And the travel assembly 3 is a crawler travel assembly having a crawler belt 3e wound over or around these driven wheels 3b, the driving wheel 3c, and the idler wheels 3d. The right and left pair of travel assembly 3 support the main frame assembly 1 so as to be capable of traveling by virtue of the fact that the track frames 3a are fixedly attached to right and left side walls 1b of the main frame assembly 1. The driving wheel 3c is rotated by a hydraulic motor 3f to move the main frame assembly 1 forward and rearward and to turn the main frame assembly 1.

Figure 4:
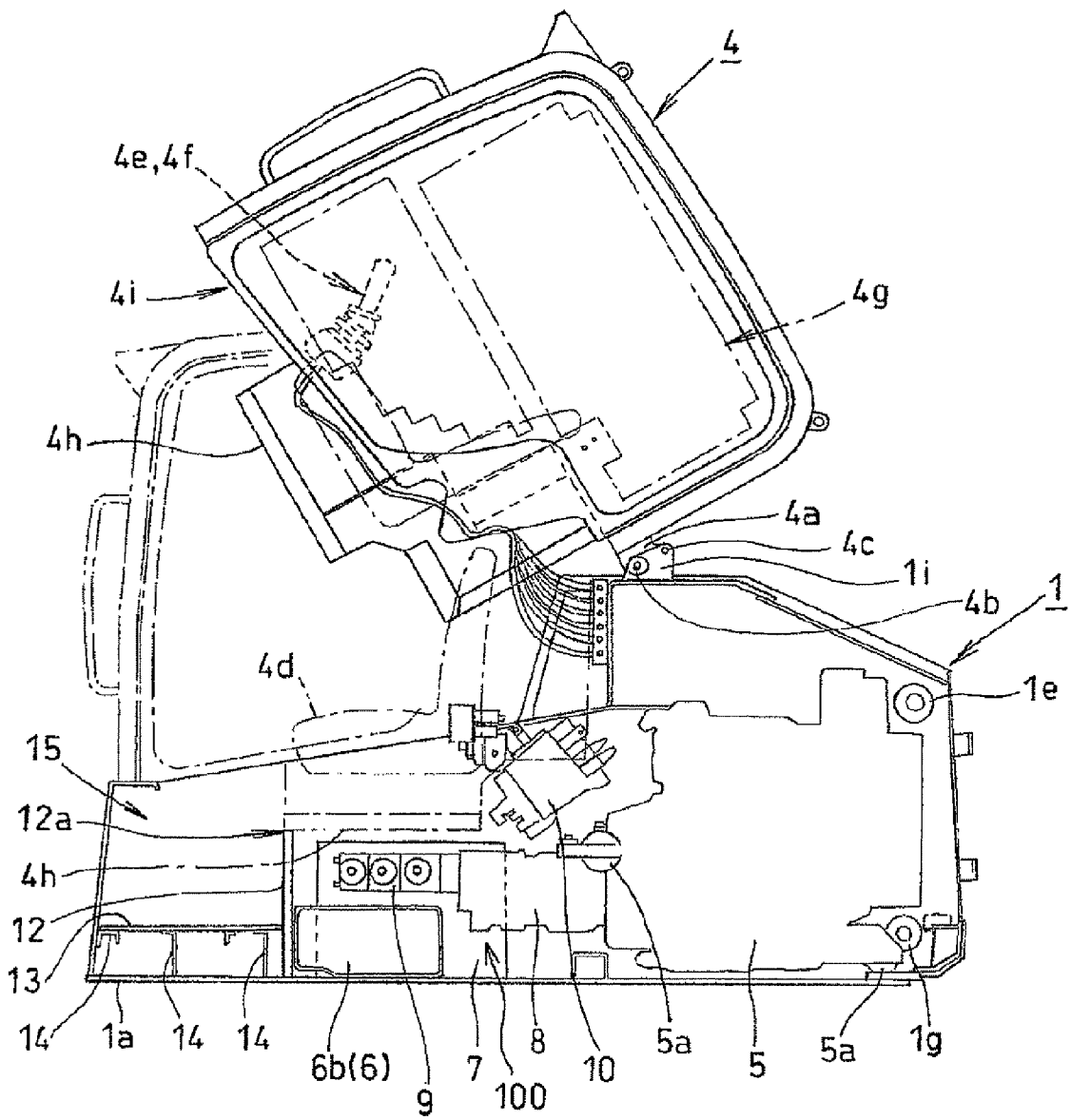
FIG. 4 is a vertical sectional side view showing the relationship between the main frame assembly and the cabin in a tilted state.
Figure 5:
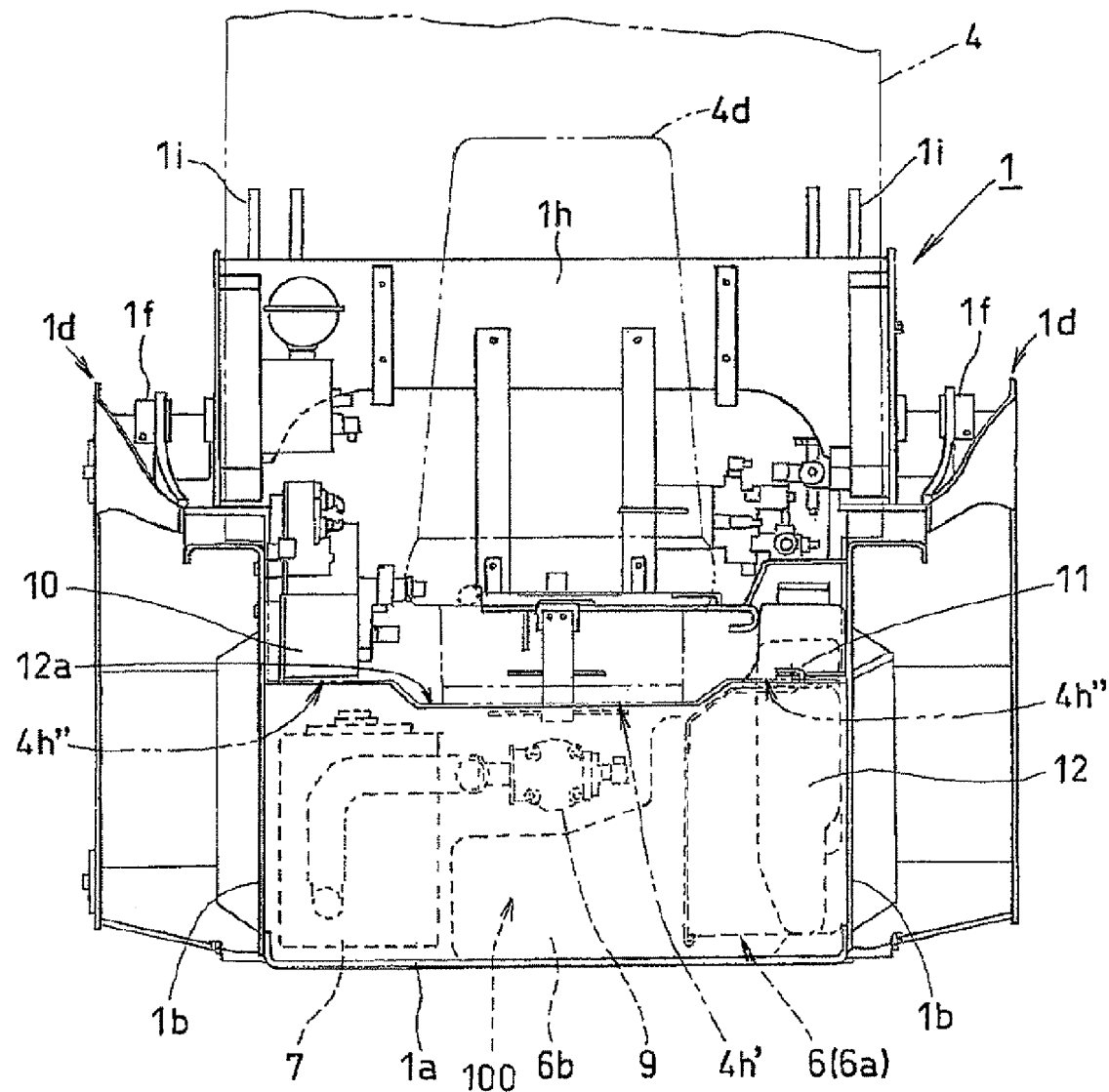
FIG. 5 is a vertical sectional front view of the main frame assembly.

The cabin 4 is formed to have a box shape, as shown in FIG. 1, FIG. 2, and FIG. 4. The attachment bracket 4a provided in the rear of the cabin 4 is pivotably attached to the support bracket 1i in the upper portion of the main frame assembly 1 to be rotatable about the laterally extending pivot shaft 4b. This cabin 4 is equipped with a well-known tilt mechanism (not shown). The cabin 4 is configured to be pivoted or rotated rearwardly and upwardly with respect to the main frame assembly 1 to an upright position about the pivot shaft 4b by operating a control lever, which opens the opening at the upper portion of the main frame assembly 1. This upright state or position is held by inserting an engaging pin 4c to both of the brackets 4a and 1i. This cabin 4 is also configured to close the opening at the upper portion of the main frame assembly 1 when the cabin 4 is rotated forwardly from the upright state to a lowered prone state or position. An operator's seat 4d is provided inside the cabin 4 and travel system control lever 4e and loader work system control lever 3f are provided to the right and left respectively of the operator's seat 4d. These control levers 4e and 4f are shown to be overlapping in FIG. 4. These control levers 4e and 4f are of a well-known joystick type. Each lever may be operated independently in the front and back direction (or the fore-and-aft direction) as well as the right and left direction (or the lateral direction) while the two levers may also be operated together. The front face of the cabin 4 is open for the operator to get on and off the vehicle. And, many small holes 4g are formed in the right and left side walls of the cabin 4 to secure the operator's field of view. The back wall of the cabin 4 has a rear window glass. The bottom 4h of the cabin 4 is mostly closed except for the front lower portion of the operator's seat 4d and an opening 4i is formed in the front lower portion of 4d of operator's seat 4d. This opening 4i is formed so that the legs of the operator in the operator's seat 4d can be stretched out from the cabin 4. The shape of the bottom of the cabin 4 is such that, as shown in FIG. 5, the laterally central portion 4h' thereof is formed to project downwardly to secure a large space for the operator in the operator's seat 4d while the lateral both side portions 4h" are raised to have a generally plate or dish shape in a cross-sectional front view. The reason why the lateral side portions 4h" of the bottom of the cabin 4 are raised higher than the central portion 4h' is to increase the space to accommodate the fuel tank 6 and the hydraulic tank 7 which are located to the left and right in the bottom 1a of the main frame assembly 1, thereby increasing the capacities of these tanks.

Figure 6:
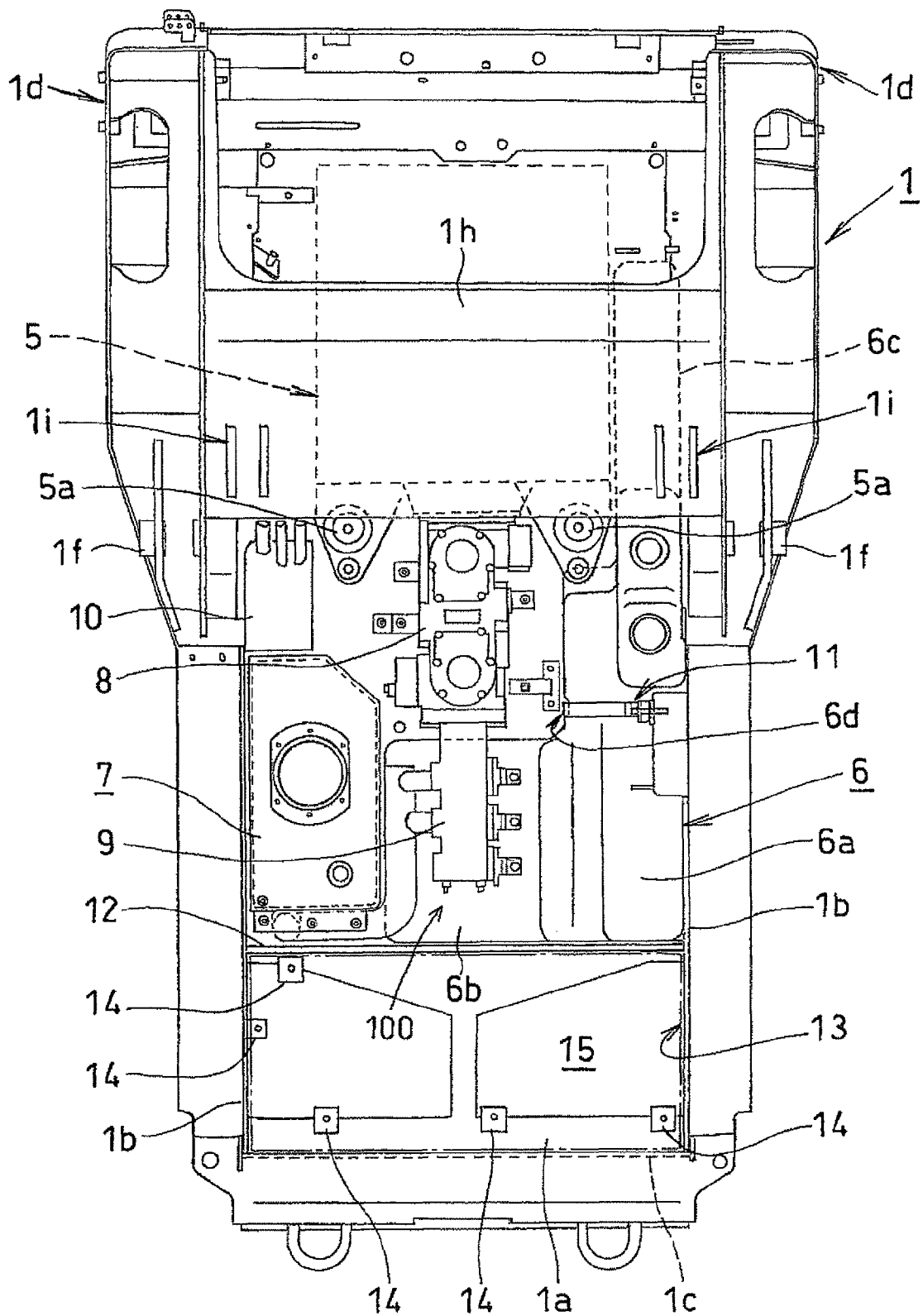
FIG. 6 is a plan view of the main frame assembly.

As shown in FIGS. 4 and 6, the engine 5 is mounted through the vibration damping support 5a so as to be oriented in the vertical and the longitudinal direction at a location closer to the rear and on the bottom 1a of the main frame assembly 1. As shown in FIGS. 4 through 6, the fuel tank 6 and the hydraulic tank 7 are carried on the left-hand side and the right-hand side on the front side portion of the bottom 1a of the main frame assembly 1. A hydrostatic transmission (HST) 8 is provided forwardly of the engine 5, and an oil pump 9, which includes three gear pumps in series, is provided forwardly of the hydrostatic transmission (HST) 8. A loader operation control valve 10 (hydraulic pressure control device) is provided in an intermediate portion of the side wall 1b in the fore-and-aft direction and on the side in which the hydraulic tank 7 is located.

A utility space 100 is formed between the oil pump 9 and the bottom 1a of the frame assembly 1.

The hydraulic tank 7 is located and fixed on the bottom 1a of the main frame assembly 1 forwardly of and on one lateral side of the engine 5 (the right hand side as seen from inside the cabin 4). And, the fuel tank 6 is removably mounted on the bottom 1a of the main frame assembly 1, at a location forwardly of and on the other lateral side of the engine 5 (the left hand side as seen from inside the cabin 4), with an attachment member 11 which consists of a band, the bolt, etc. Incidentally, the hydraulic tank 7 and the fuel tank 6 may also be located on the lateral sides opposite from the arrangement described above.

The fuel tank 6 includes a main body portion 6a, a laterally extending portion 6b projecting from this main body portion 6a and into the utility space 100 below the oil pump 9, and a rearwardly extending portion 6c projecting rearwardly from the main body portion 6a. That is, as shown in FIG. 6, the fuel tank 6 has its rearwardly extending portion 6c extending rearwardly from the rear of the main body portion 6a, and is arranged on one lateral side of the engine 5 and closer to the side wall 1b in a space elongated in the fore-and-aft direction between the engine 5 and the side wall 1b of the main frame assembly 1. The height (upper surface) of the main body portion 6a of the fuel tank 6 and the rearwardly extending portion 6c are arranged to be higher than the upper surface of the oil pump 9, but is arranged to be lower than the bottom 4h of the cabin 4 in its lowered position. As shown in FIG. 4 and FIG. 5, the laterally extending portion 6b of this fuel tank 6 projects from the main body portion 6a into the space below the oil pump 9. The height of the portion, located in the space below the oil pump 9, of this laterally extending portion 6b is arranged to be lower than the lower end of the oil pump 9. The attachment location of the attachment member 11, which fixedly mounts the fuel tank 6 to the main frame assembly 1, is at a part of main body portion 6a, and in the present embodiment, is at a position on the main body portion 6a just behind where the laterally extending portion 6b projects out (as shown in FIG. 6, a recessed groove 6d is formed in the fuel tank 6 at the position at which the band is attached). And, the attachment member 11 of the fuel tank 6 is located on the upper surface side of the fuel tank 6 so that it can be easily operated to a removal position and an attaching position from the upper opening of the main frame assembly 1 when the cabin 4 is tilted to lift it up rearwardly. And, the attachment and removal of the fuel tank 6 can be facilitated by providing only one attachment location for the fuel tank 6 by the attachment member 11. However, the fuel tank 6 may also be fixed at two or more locations.

The hydraulic tank 7 is formed approximately in the shape of a rectangular box, and is arranged in the space between the side wall 1b of the main frame assembly 1 on the side opposite from where the fuel tank 6 is located, and the oil pump 9 and the hydrostatic transmission (HST) 8. The upper surface of the hydraulic tank 7 is arranged to be lower than the lower end of the loader operation control valve 10.

And, a divider plate 12, with which the inside of the main frame assembly 1 is divided between a forward section and a rearward section, is provided forwardly of the fuel tank 6 and the hydraulic tank 7. The upper surface 12a of this divider plate 12 is configured such that when the bottom 4h of the lowered cabin 4 contacts the upper surface 12a in the regular driving posture of the cabin 4, the upper surface 12a of this divider plate 12 blocks off the forward section from the rear section and vise versa inside the main frame assembly 1. This divider plate 12 is removably attached to inside surfaces of both side walls 1b of the main frame assembly 1 through attachment members (not shown), such as the attachment bolts.

The step board 13 for the operator is installed forwardly of the divider plate 12 and on the bottom 1a of the main frame assembly 1. This step board 13 is provided in the front portion of the bottom 1a of the main frame assembly 1 as a member which supports the legs of the operator in the operator's seat 4d in the cabin 4. The step board 13 is supportedly placed on a plurality of mounts 14 arranged vertically on the bottom 1a of the main frame assembly 1, and are removably fixed by bolts. As shown in FIG. 6, while the mounts 14 are provided at two or more places (three locations are shown in FIG. 6) on the front end side of the step board 13, the mount 14 is installed only on the side of the hydraulic tank 7 in the back end portion of the step board 13, and no mounts 14 are provided on the side of the fuel tank 6. This is done out of consideration that the mount 14 would not become an obstacle when removing the fuel tank 6. The fuel tank 6 can only be pulled forward to the position at which the laterally extending portion 6b is out from under the oil pump 9, thereafter, the tank 6 is pulled out upward.

The fuel tank 6 is pulled out toward the front of the main frame assembly 1 and removed by removing the divider plate 12 and the step board 13 from the main frame assembly 1. That is, a removal space 15 for pulling out and taking out the fuel tank 6 is formed and secured forwardly of the main frame assembly 1 by removing the divider plate 12 and the step board 13. This removal space 15 also serves as a step space for the operator, and is arranged to be used when removing the fuel tank 6 since the space is not utilized during a maintenance, etc.

The hydrostatic transmission (HST) 8 changes speed by adjusting the supply amount of the hydraulic fluid to the hydraulic motor 3f of the travel assembly 3. A direction change of the hydraulic motor 3f of the travel assembly 3 is effected by operating the travel system control lever 4e provided in the cabin 4 in the lateral (or right-and-left) direction or the fore-and-aft direction. And, adjustment of the rotation speed (speed change) of the hydraulic motor 3f is proportional to the amount of the degree of operating angle of the travel system control lever 4e. These operations cause switching of the main hydraulic circuit and adjustment of the speed change device through the pilot hydraulic circuit (not shown).

The oil pump 9 supplies and discharges hydraulic fluid from the hydraulic tank 7 through the loader operation control valve 10 to the boom cylinder 2e and bucket cylinder 2p of the boom assembly 2 to effect the raising and lowering operation of the boom 2a and scooping and dumping movements of the bucket 2b.

As shown in FIG. 4, the travel system control lever 4e of a joystick type for operating the pilot pressure of the hydrostatic transmission (HST) 8, and the loader work system control lever 4f of a joystick type for operating the pilot pressure of the loader operation control valve 10 are provided within the cabin 4 and to the left and right of the operator's seat 4d.

The pilot hydraulic circuit (not shown) of the hydrostatic transmission (HST) 8 is controlled by operating the travel system control lever 2e, and the main circuit is controlled by this pilot hydraulic circuit to control the direction of the rotation and the rotation speed of hydraulic pressure motor 3f of the travel assembly 3.

The pilot hydraulic circuit (not shown) of the operation control valve 10 is controlled by operating the loader work system control lever 4f, and the operation control valve 10 is controlled by this pilot hydraulic circuit to extend and retract the boom cylinder 2e and bucket cylinder 2p of the boom assembly 2.

As described above, in the skid steer loader of the present invention, since the fuel tank 6 and the hydraulic tank 7 are located on the main frame assembly 1 forwardly of and to the right and left of the engine 5, the balance between the heavy components carried by the main frame assembly 1 is improved. And, since these heavy components are arranged at the bottom of the main frame assembly 1, the center of gravity of the skid steer loader becomes low, thus improving stability.

And, with the skid steer loader of the present invention, a checking and maintenance of the fuel tank 6 and the hydraulic tank 7 may be performed easily by tilting (the operating means is not shown) or lifting the cabin 4 rearwardly about the pivot shaft 4b. More specifically, the fuel tank 6 can be removed from the main frame assembly 1, and a maintenance work such as cleaning etc. can be performed thoroughly and easily. And, a checking and maintenance of the hydraulic tank 7 and the oil pump 9 can be performed without the cabin 4 getting in the way in the area under the front of the cabin 4 which is lifted up toward the rear. And the hydraulic paths and the hydraulic equipment which are connected to these can be maintained simultaneously and collectively.

Since the laterally extending portion 6b projecting into the utility space 100 formed below the oil pump 9 is provided as a part of the fuel tank 6, the capacity of the fuel tank 6 may be increased.

There is provided the divider plate 12 forwardly of the fuel tank 6 and the hydraulic tank 7, the divider plate 12 in collaboration with the bottom 4h of the cabin 4 can divide the internal space of the main frame assembly 1 into the forward and rear sections. Heat and noise from the engine 5 are blocked and adverse influence to the cabin 4 is prevented by this divider plate 12 during travel and loader work of the skid steer loader. And the divider plate 12 can be removed from the main frame assembly 1 when the fuel tank 6 is removed to the removal space 15.

Since an opening 4i is provided in the front lower portion of the cabin 4, the operator in the operator's seat 4d can stretch the legs out forward, and can place the feet on the step board 13 at the bottom of the removal space 15 of the main frame assembly 1. This step board 13 can be removed from the main frame assembly 1 during removal of the fuel tank 6 into the removal space 15.

Furthermore, at the time of check maintenance, the cabin 4 can be lifted up rearwardly, and the divider plate 12 can be removed to perform a check maintenance of the hydraulic tank 7, the oil pump 9, hydraulic pipes or paths, and the hydraulic equipment with ease.

Figure 7:
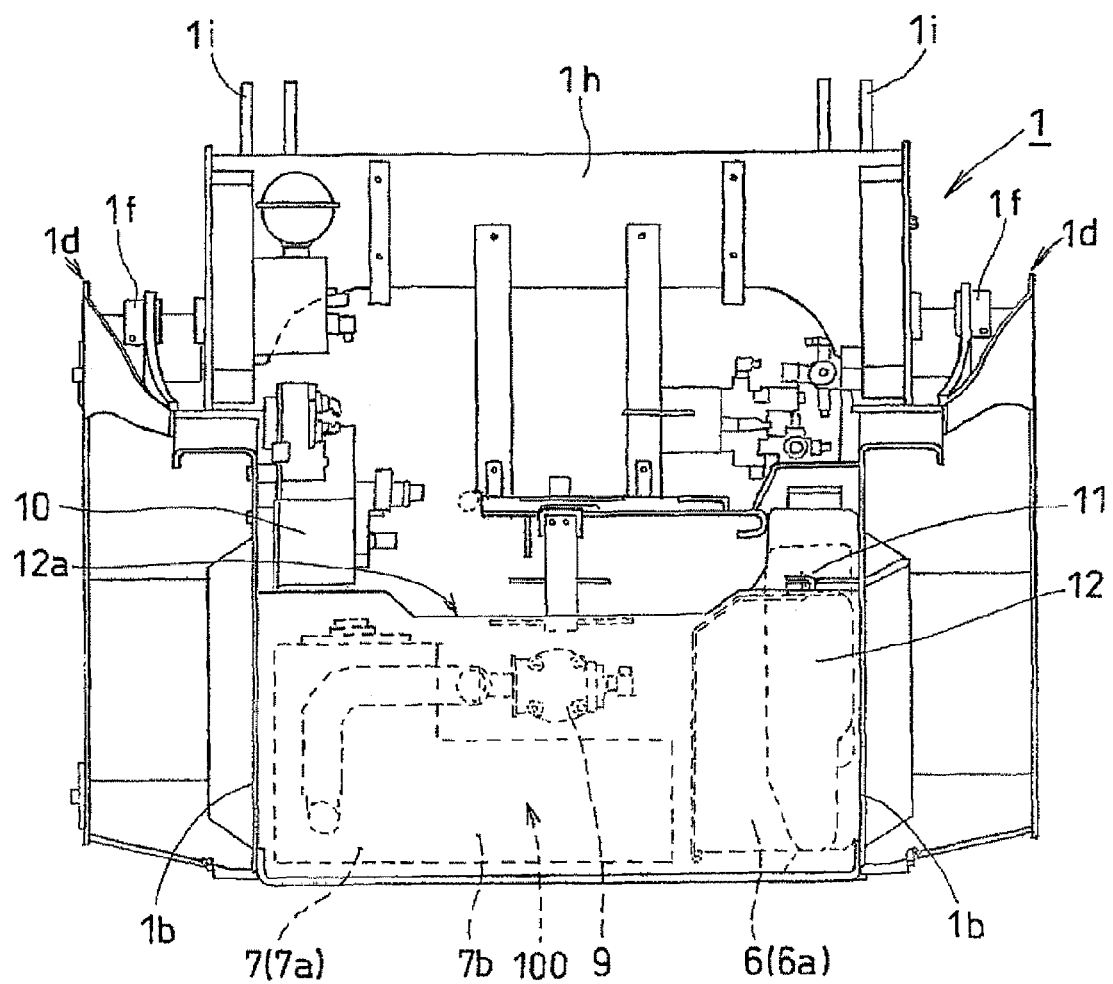
FIG. 7 is a vertical sectional front view of the main frame assembly in another embodiment.

While the laterally extending portion 6b projected from the fuel tank 6 into the utility space 100 space under the oil pump 9 was provided in the above-mentioned embodiment as an example, as shown in FIG. 7, the laterally extending portion 7b projected from the hydraulic tank 7 into the space below the oil pump 9 may be provided to increase the capacity of the hydraulic tank 7 in the present invention. In this case, the hydraulic tank 7 may include a main body portion 7a and the laterally extending portion 7b projected out from this main body portion 7a into the utility space 100 space under the oil pump 9, and may additionally include a rear extension portion (not shown) if needed. In addition, in the skid steer loader of the present invention, laterally extending portions projected from both the fuel tank 6 and the hydraulic tank 7, with each projecting portion extending half way into the utility space 100 under the oil pump 9, may be provided as another embodiment to increase the capacity of both tanks 6 and 7. Also, heavy components other than the fuel tank 6 or the hydraulic tank 7 may be located in this utility space 100.

Although the embodiments of the present invention are as described above, the present invention is not limited only to these embodiments, and may be changed in various manners. For example, the shapes of the fuel tank 6 and the hydraulic tank 7 are not limited to those in the embodiment, and the fuel tank 6 may be mounted and attached in different ways.

Furthermore, the divider plate 12 and the step board 13 may be provided in the cabin 4 side, and the removal space 15 then becomes an accommodating space for the divider plate 12 and the step board 13.

What is claimed is:

1. A skid steer loader comprising:
   a main frame assembly having a pair of right and left side walls extending along a travel direction;
   a boom assembly mounted to the main frame assembly;
   a pair of right and left travel assemblies for supporting the main frame assembly on the ground;
   a cabin mounted to an upper portion of the main frame assembly so as to be capable of being tilted;
   an engine located on the main frame assembly so as to be oriented in a longitudinal direction and at a location closer to a rear of the main frame assembly than to a front portion of the main frame assembly;
   a hydrostatic transmission and an oil pump that are connected to a front portion of the engine;
   a hydraulic tank located on the bottom of the main frame assembly and between one of said side walls and said oil pump; and
   a fuel tank disposed to face said hydraulic tank along a direction transverse to said main frame assembly, said fuel tank including:
   a main body portion disposed to the other side wall, and
   a laterally extending portion projecting from said main body into a utility space between said oil pump and said bottom portion.

2. A skid steer loader as defined in claim 1, wherein the fuel tank further includes a rearwardly extending portion.

3. A skid steer loader as defined in claim 1, wherein the fuel tank is removably attached to the main frame assembly and wherein a removal space capable of holding said fuel tank is formed within the main frame assembly and forwardly of the fuel tank.

4. A skid steer loader as defined in claim 3, wherein the removal space is formed forwardly of a divider plate for dividing an internal space into a forward section and a rear section, wherein a step plate for an operator is provided on a bottom of the removal space, and wherein the divider plate and the step are removably and fixedly attached to the main frame assembly.

5. A skid steer loader as defined in claim 1, wherein the boom assembly includes booms to which a work tool is attached at distal ends thereof, wherein proximate portions of the right and left booms are vertically pivotably supported to rear portions of the main frame assembly such that forward portions of the booms can be raised and lowered forwardly of the main frame assembly, and wherein a pair of right and left boom cylinders for raising and lowering the booms are provided between locations of the booms closer to proximate portions thereof and rear portions of the main frame assembly.

6. A skid steer loader as defined in claim 1, wherein the cabin has a bottom portion which is shaped such that a laterally central portion of the bottom portion projects downwardly and lateral both end portions are raised to have a dish-shape as a whole in a front cross-sectional view.

7. A skid steer loader as defined in claim 1, wherein the oil pump is located in a vicinity of a laterally central area of the main frame assembly.

8. A skid steer loader comprising:
   a main frame assembly having a pair of right and left side walls extending along a travel direction;
   a boom assembly mounted to the main frame assembly;
   a pair of right and left travel assemblies for supporting the main frame assembly on the ground;
   a cabin mounted to an upper portion of the main frame assembly so as to be capable of being tilted;
   an engine located on the main frame assembly so as to be oriented in a longitudinal direction and at a location closer to a rear of the main frame assembly than to a front portion of the main frame assembly;
   a hydrostatic transmission and an oil pump that are connected to a front portion of the engine;
   a fuel tank located on the bottom of the main frame assembly and between one of said side walls and said oil pump;
   a hydraulic tank disposed to face said fuel tank along a direction transverse to said main frame assembly, said hydraulic tank including:
   a main body portion disposed to the other side wall, and
   a laterally extending portion projecting from said main body into a utility space formed between said oil pump and said bottom portion.

9. A skid steer loader as defined in claim 8, wherein the boom assembly includes booms to which a work tool is attached at distal ends thereof, where proximate portions of the right and left booms are vertically pivotably supported to rear portions of the main frame assembly such that forward portions of the booms can be raised and lowered forwardly of the main frame assembly, and wherein a pair of right and left boom cylinders for raising and lowering the booms are provided between locations of the booms closer to proximate portions thereof and rear portions of the main frame assembly.

10. A skid steer loader as defined in claim 8, wherein the cabin has a bottom portion which is shaped such that a laterally central portion of the bottom portion projects downwardly and lateral both end portions are raised to have a dish-shape as a whole in a front cross-sectional view.

11. A skid steer loader as defined in claim 8, wherein the oil pump is located in a vicinity of a laterally central area of the main frame assembly.

* * * * *